Jan. 29, 1957

R. A. KOLPEK 2,779,816

SENSING AND DETECTING CIRCUITS IN
A TELEGRAPH SWITCHING SYSTEM

Filed March 1, 1955

INVENTOR.
ROBERT A. KOLPEK

BY

ATTY.

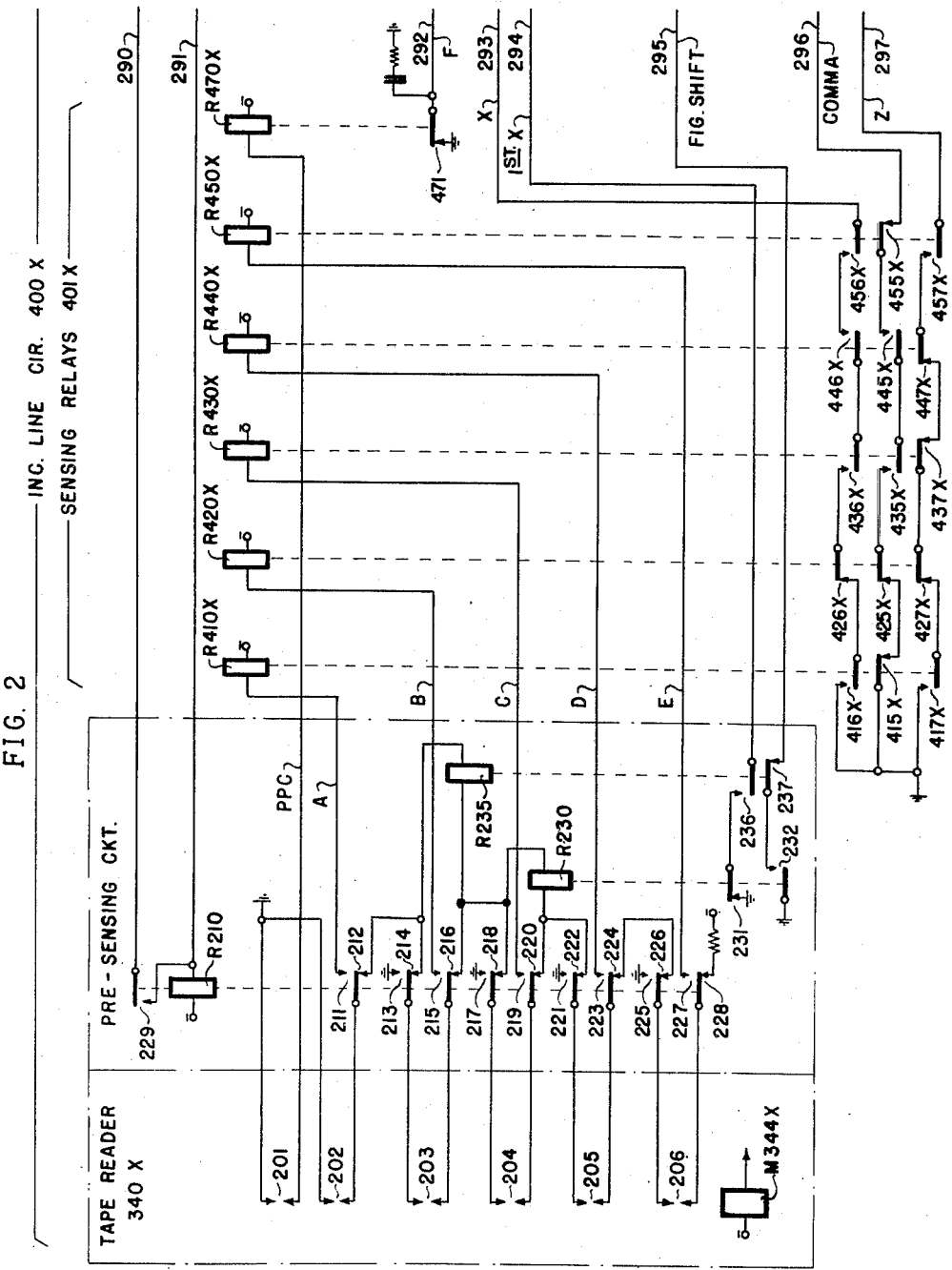

INVENTOR.
ROBERT A. KOLPEK

United States Patent Office 2,779,816
Patented Jan. 29, 1957

2,779,816

SENSING AND DETECTING CIRCUITS IN A TELEGRAPH SWITCHING SYSTEM

Robert A. Kolpek, Waukegan, Ill., assignor to Automatic Electric Laboratories, Inc., Chicago, Ill., a corporation of Delaware Application March 1, 1955, Serial No. 491,465

7 Claims. (Cl. 178—2)

This case relates in general to automatic telegraph switching systems and more particularly to control information sensing and detecting circuits for use therein.

A prior application, Serial No. 260,854, filed December 10, 1951, by Richard C. Stiles, disclosed a completely automatic telegraph switching system in which sensing or decoding relays, controlled by a tape reader, and a detector-register, controlled by said sensing relays, were utilized to detect and register certain codes—i. e. XZXZXZX and figure shift , , , , , ,—which indicated respectively the start and the end of a message. The sensing relays of Stiles were arranged in such a manner that they were continuously operated whenever the tape reader operated to sense a character. Said sensing relays were utilized to control said start and end of message detector and also to control other detecting and registering circuits; however, it is contemplated that the tape reader itself rather than the sensing relays may be used to control said other detecting and registering circuits. For example, the tape reader contacts 201—206 will control the detector and an additional set of contacts corresponding to contacts 201—206 and operated in unison therewith will control all other circuits. Therefore, it will be possible to eliminate the continuous operation of the sensing relays.

In view of the above, it is one object of this invention to provide means whereby the sensing relays will be operated only while the start of message and the end of message codes are being sensed by the tape reader.

Said start and end of message detector-register of Stiles uses fourteen relays in addition to the figure shift relay and the end of message relay. Said start and end of message detector of Stiles also uses two holding circuits—i. e. Z hold and X hold—and it also uses two separate alarm relays, one for detecting a start of message code received out of order and the other for detecting an end of message code received out of order, either of which conditions indicate that a message may have been lost in transmission or that two messages may have inadvertently been joined as one message. Accordingly, it is another object of this invention to reduce the number of relays in said start and end of message detector, to reduce the number of hold conductors to one and to provide means whereby the same alarm relay will detect either a start of message code or an end of message code out of order.

A feature of this invention is that the circuits for operating and for holding the relays in the detector have fewer contacts included therein.

Another feature is the greater simplicity of the detector-register circuits.

Another feature is a detector circuit in which no more than two counting relays are operated simultaneously, whereby only two relays must restore if a start or end of message code has a wrong sequence of characters.

Another feature of this invention is the use of pre-sensing relays which operate when the first character of the start or end of message code is sensed by the tape reader to connect the sensing (decoding) relays to the tape reader, whereby the sensing relays are operated only while correct characters of said codes are being sensed in their sequence by the tape reader. In effect, the pre-sensing relays and the sensing (decoding) relays form one sensing (or decoding) circuit; and, in combination with the detector-register relays, one detecting-registering unit is formed, in which unit the individual elements are operated as seldom as possible.

Other objects and features will be evident upon a perusal of the following description in which:

Fig. 2 shows in detail the contacts operated by the tape reader, a pre-sensing circuit, a sensing circuit controlled by said contacts and the tape reader magnet for cyclically operating said contacts;

Although the preferred embodiment of the present invention has been adapted for use in the incoming line circuit of the switching system disclosed in said Stiles application, it will be understood that the invention can also be utilized in the cross office unit of said system and in other types of telegraph switching systems.

Figure 1:
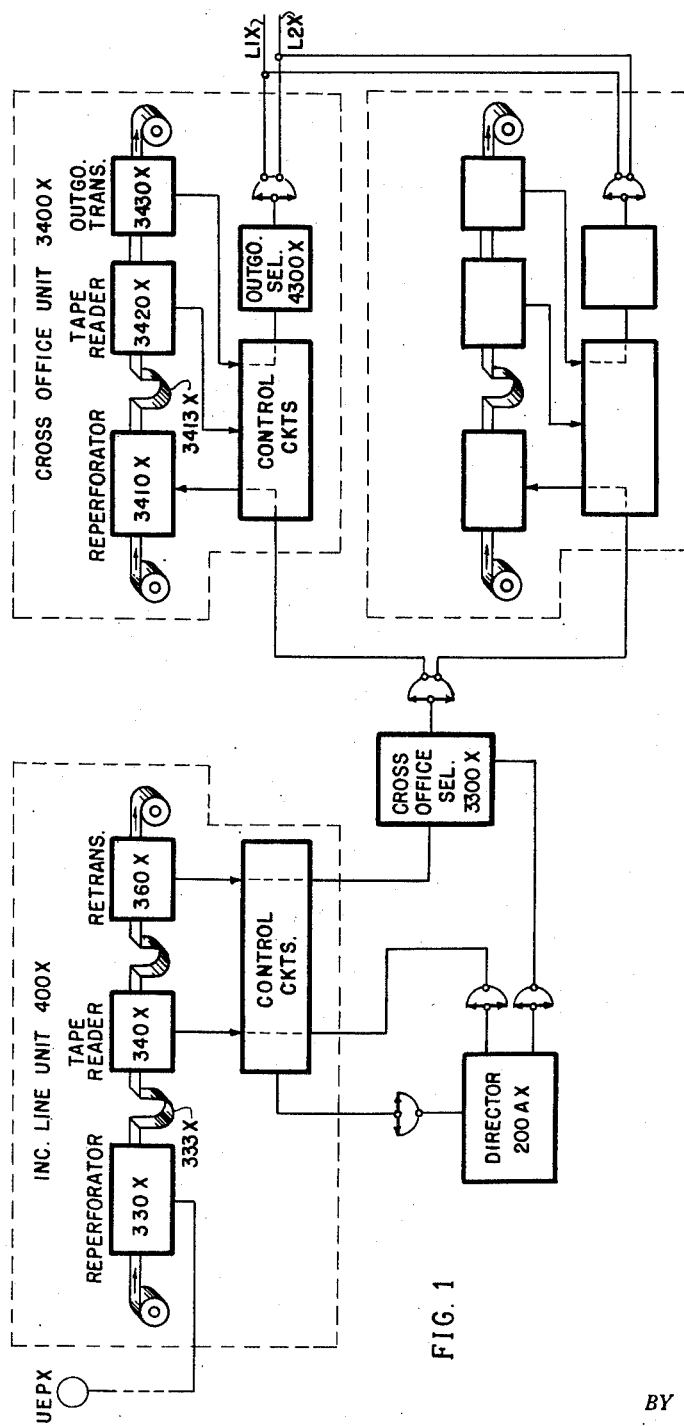
Fig. 1 shows in block diagram one type of switching system in which the present invention may be utilized, said system being the one disclosed in said application of Stiles.

In order to provide a clearer understanding of the present invention, the operation of the switching system in said Stiles application will be briefly discussed insofar as it is believed pertinent to the present invention. Attention is directed to Fig. 1 herein in which the reference numerals of each element is the same as its corresponding element in the Stiles application except that the letter "X" is inserted after each reference numeral. When a message from a distant office UEPX is received at the incoming line circuit 400X of the switching center, a reperforator 330X records said message on a tape 333X, which tape is fed to a tape reader 340X. Upon the successful detection of a start of message code by tape reader 340X and the circuits shown in Figs. 2 and 3 herein, a director 200AX is seized for the purpose of controlling the routing of the message in accordance with the routing instructions included within the message. The director seizes an available cross office unit such as 3400X by way of a selector 3300X, causes said cross office unit to be connected to the desired outgoing line by way of its selector 4300X, and then causes said cross office unit to be connected to the transmitting device 360X in said incoming line circuit. The tape 333X is then fed to said transmitting device 360X for re-transmission of the message to the cross office unit. A reperforator 3410X records the message on a second tape 3413X in the cross office unit; and, when the desired outgoing line is idle, a second transmitting device 3430X in the cross office unit will re-transmit said message over the outgoing line.

Figure 3:
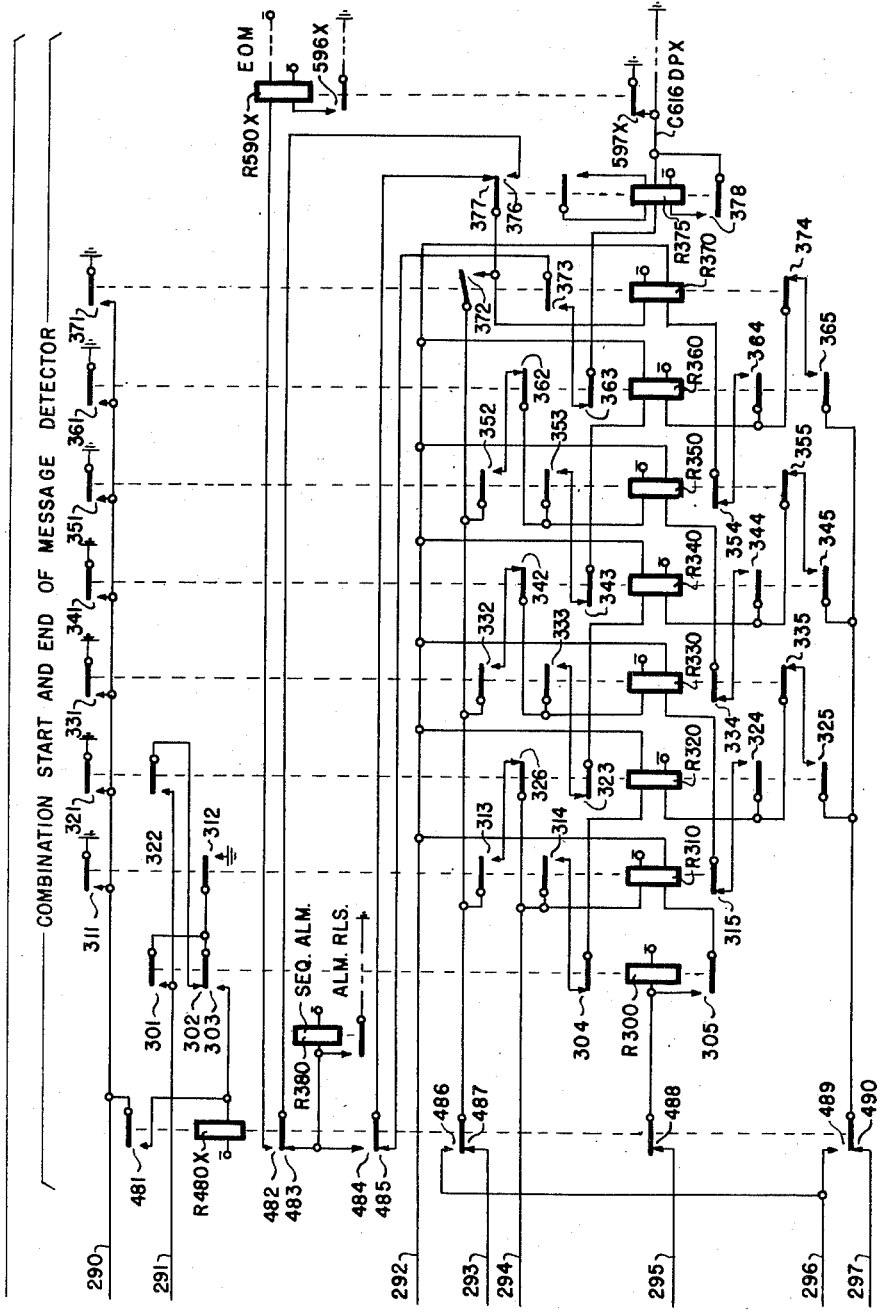
Fig. 3 shows a combination start and end of message detector circuit.

Those elements shown in Figs. 2 and 3 of the present application, which correspond identically to the elements of said Stiles application, have also been given the same reference numerals with the letter "X" affixed thereafter, for example sensing relays 401X of Fig. 2 herein correspond to sensing relays 401 of said Stiles application, contacts 416X to contacts 416 and end of message relay R590X of Fig. 3 to R590 of said Stiles application.

It will be noted that the sensing relays 401X are normally disconnected from the contacts of tape reader 340X according to the present invention. A pair of pre-sensing relays are connected to said tape reader contacts in such a manner that if the character X is sensed by the tape reader one of said relays is operated and if the figure shift character is sensed the other relay is operated. When either of said two relays is operated, it causes the operation of an accept relay, which accept relay disconnects said two pre-sensing relays from the tape reader contacts and connects said contacts to the respective sensing relays 401X. The characters X and figure shift perform this operation due to the fact that they are the first characters of a start of message code and an end of message code respectively. After the respective one of said pre-sensing relays is operated by the tape reader sensing the character X, assume that the remaining characters ZXZXZX of a start of message code are sensed by the tape reader. The pre-sensing relay, operated when the first X was received, also caused the first relay in the start and end of message detector to be operated in series with the second relay in said detector. When the first Z is sensed by the tape reader, the sensing relays cause said first relay in the detector to restore and said second relay to operate in series with the third relay in the detector. In this manner the fourth, fifth, sixth, seventh and eighth relays in said detector will be operated respectively one at a time by the sensing relays when the following XZXZX characters are sensed by the tape reader; and at the same time the second, third, fourth, fifth and sixth relays in the detector will be restored one at a time. When the entire start of message code has been successfully detected, only the eighth relay of the detector will be maintained operated, at which time the accept relay is restored to disconnect the sensing relays from the tape reader contacts and to reconnect pre-sensing relays to said tape reader contacts. Assume that subsequently an end of message code comprising a figure shift character followed by seven commas is sensed by the tape reader. The figure shift will cause the respective pre-sensing relay to operate to reconnect the sensing relays to the tape reader contacts and to operate a control relay in series with the first relay of the start and end of message detector. Said control relay will cause a figure shift relay to operate and lock for the purpose of completing a circuit whereby the sensing relays will cause the second, third, fourth, fifth, sixth and seventh relays of the start and end of message detector to operate when the tape reader senses the succeeding seven commas in a manner similar to which said relays are operated when the start of message code is sensed. Instead of the eighth detector relay operating in series with the seventh relay when the last comma is sensed, an end of message relay will be operated in series with said seventh relay.

In the event that two start of message codes are received consecutively or in the event that two end of message codes are received consecutively, a sequence alarm relay will be operated to give an alarm.

The typing reperforators 330X and 3410X are conventional type mechanisms for perforating a tape in accordance with a five channel code—e. g. the typing reperforator disclosed in the United States Patent No. 2,255,794 granted to R. A. Lake on September 16, 1941.

The tape readers 340X and 3420X and the transmitters 360X and 3430X are conventional type mechanisms for transmitting electrical signals in accordance with the tape perforations sensed by said mechanisms—e. g. United States Patent No. 2,296,845 granted to N. T. Goetz on September 29, 1942.

Figure 4:
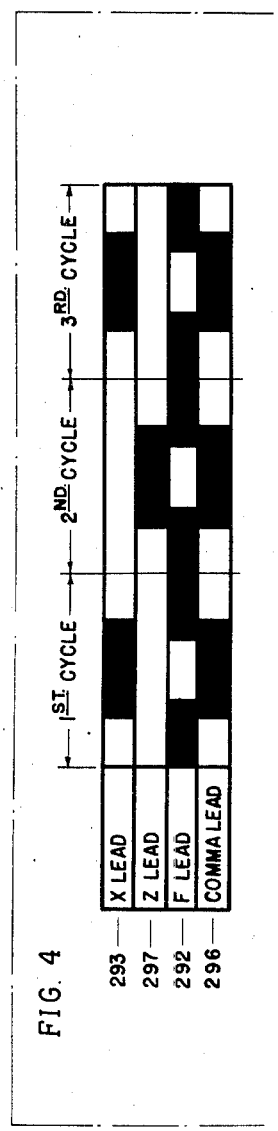
Fig. 4 is a chart showing the marking of conductors 292, 293, 296 and 297 while the tape reader is sensing a start or end of message code.

It is felt that for purposes of the present application only the operation of description of the tape reader 340X need be described briefly. The tape reader 340X includes a clutch magnet M344X and cam controlled contacts 201 which are momentarily closed during each cycle of operation in which the tape reader 340X pulls the tape 333X an additional step equal to the longitudinal distance between equally spaced feed holes perforated in the center portion of the tape 333X by the reperforator 330X. Also cam controlled contacts 202—206 are momentarily closed in predetermined code combinations as the tape reader 340X senses or reads the character code perforations appearing in lateral rows on the tape. All of said contacts 201—206 are closed substantially simultaneously for a predetermined part of the time interval required for one cycle of operation of the tape reader 340X. With particular reference to Fig. 4 it will be noted that certain of the relays R410X—R450X are operated to connect ground potential to conductor 293 for about 50% of one cycle of operation of the tape reader 340X when the character X is sensed. Similarly, conductors 297 and 296 are grounded for about 50% of a cycle of operation when the characters Z and comma (,) respectively are sensed. However, the contacts 471 of the relay R470X are adjusted such that they operate to remove ground from conductor 292 a short time after ground potential is connected to conductor 293, 297 or 296 (depending upon which character is sensed by tape reader 340X) and such that ground potential is again connected to conductor 292 a short time before ground potential is removed from said conductor 293, 297 or 296. This relative timing of relays R410X—R450X and R470X is utilized to assure the proper operation of the relay chain in the combination start and end of message detection of Fig. 3. For example, assume that relays R310 and R320 (Fig. 3) have been operated in a manner to be described below when a first character X of a start of message code has been sensed and that said relays R310 and R320 are held operated over a circuit extending from battery through the upper winding of R310, contacts 314 and 304, the upper winding of R320 and conductor 292, to ground on contacts 471 of Fig. 2. Assume that the tape reader R340X then senses the second character Z of a start of message code to operate relays R410X, R450X and R470X in a manner described below. Ground potential is connected to conductor 297 and extended over contacts 490, 325 and 335 to battery on the lower winding of R320 to hold R320 operated slightly before ground potential is removed from conductor 292 at contacts 471 to open the above-mentioned holding circuit for relays R310 and R320. R310 restores; and, at contacts 315, extends said ground potential from conductor 297 over contacts 490, 325, 335, 324 and 315 to one terminal of the lower winding of R330. When ground is subsequently connected to conductor 292 by the restoration of R470X, it is extended over said conductor 292 to the other terminal of the lower winding of R330. Relay R330 is thereby short circuited, and its operation is prevented until relays R410X and R450X restore shortly thereafter to remove ground from conductor 297. When R410 and R450 restore, said short circuit on the lower winding of R330 is removed; and R330 operates in series with R320 over a circuit extending from battery through the lower winding of R320, contacts 324 and 315, the lower winding of R330 and conductor 292 to ground potential on contacts 471.

The operations of all subsequent relays in the detection are similar to that described immediately above for relays R320 and R330; and, therefore, a detailed description of the critical timing of each operation will not be made.

DETAILED DESCRIPTION

*Tape reader 340X senses a start of message code XZXZXZX*

When the tape reader 340X (Fig. 2) senses the character X contacts 202, 204, 205 and 206 are momentarily and simultaneously closed in a manner well known in the art to operate relay R235 over a circuit extending from ground over contacts 202 and 212, the winding of R235, contacts 218, 204, 220, 222, 205, 224, 226, 206 and 228 to resistance battery. It will be noted that contacts 204 short circuit relay R230 to prevent its operation. It will be noted that the contacts 201 are operated momentarily during the sensing of every character to operate the pulse per character relay R470X, but this is of no consequence at this time. At contacts 236, relay R235 operates relay R310 (Fig. 3) over a circuit extending from ground over contacts 231 and contacts 236, conductor 294 through the winding of R310 to battery. At contacts 314, R310 prepares a circuit for operating R320. When contacts 201, 202, 203, 205 and 206 of tape reader 340X subsequently open, relay R470X will restore first to complete the operating circuit for R320; but R235 short circuits R320 at contacts 236. Soon thereafter, R235 restores; the short circuit will be removed from the upper winding of relay R320 (Fig. 3); and R320 will operate in series with R310 over a circuit extending from battery through the upper winding of R310, contacts 314 and 304 through the upper winding of R320 over conductor 292 to ground at contacts 471. When R320 operates, it closes contacts 322 to operate the accept relay R210 (Fig. 2) over a circuit extending from ground over contacts 312, 302 and 322, conductor 291 through the winding of R210 to battery; at contacts 325, R320 prepares a circuit for maintaining itself operated when the next character is sensed by the tape reader 340X; and, at contacts 324, prepares a circuit for operating R330 at the end of the sensing of said next character. At contacts 229, R210 locks itself operated over a circuit extending from battery over the winding of R210, contacts 229, conductor 290 and ground potential on contacts 311 and 321; at contacts 211, 213, 215, 217, 219, 221, 223, 225 and 227, R210 prepares circuits for operating the sensing relays 401X (Fig. 2) under the control of the tape reader 340X; and, at contacts 212, 214, 216, 218, 220, 222, 224, 226 and 228, R210 disconnects the pre-sensing relays R230 and R235 from the tape reader contacts.

When the tape reader 340X senses the second character Z of the start of message code, contacts 201, 202 and 206 close to operate relays R470X, R410X and R450X respectively. At contacts 471, R470X opens the circuit over which R310 and R320 have been held operated. R310 will restore; however, because the second character Z has been sensed, relay R320 will be maintained operated by relays R410X and R450X over a circuit extending from ground over contacts 417X, 427X, 437X, 447X and 457X, conductor 297, contacts 490, 325 and 335, through the lower winding of R320 to battery. When relays R410X, R450X and R470X subsequently restore, relay R330 (Fig. 3) will be operated in series with R320 over a circuit extending from battery over the lower winding of R320, contacts 324 and 315, the lower winding of R330 and conductor 292 to ground on contacts 471.

When the tape reader 340X senses the third character X of the start of message code contacts 201, 202, 204, 205 and 206, are momentarily and simultaneously closed to operate relays R470X, R410X, R430X, R440X and R450X respectively over obvious circuits. At contacts 471, R470X opens the above-mentioned circuit for holding relays R330 and R320 operated. R320 restores; however, because the third character X has been sensed, R330 will be maintained operated by relays R410X, R430X, R440X and R450X over a circuit extending from battery through the upper winding of R330, contacts 342, 332 and 487, conductor 293, and contacts 456X, 446X, 436X, 426X and 416X to ground. When said relays R410X, R430X, R440X, R450X and R470X subsequently restore, R340 (Fig. 3) will operate in series with R330 over a circuit extending from ground over contacts 471, conductor 292, the upper winding of R340, contacts 323 and 333, and through the upper winding of R330 to battery.

When the tape reader 340X senses the fourth character Z of the start of message code, contacts 201, 202 and 206 close to operate relays R470X, R410X and R450X respectively. At contacts 471, R470X open the circuit over which relay R340 was operated in series with R330. R330 will restore; however, because the fourth character Z has been sensed, relay R340 will be maintained operated by relays R410X and R450X over a circuit extending from ground over contacts 417X, 427X, 437X, 447X and 457X, conductor 297, contacts 490, 345 and 355 through the lower winding of R340 to battery. When relays R410X, R450X and R470X subsequently restore, relay R350 (Fig. 3) will be operated in series with R340 over a circuit extending from ground over contacts 471, conductor 292, the lower winding of R350, contacts 334 and 344 through the lower winding of R340 to battery.

When the tape reader 340X senses the fifth character X of the start of message code, contacts 201, 202, 204, 205 and 206 are closed to operate relays R470X, R410X, R430X, R440X and R450X respectively. At contacts 471, R470X opens the circuit over which relays R340 and R350 have been held operated. R340 will restore; however, because the fifth character X has been sensed, relay 350 will be maintained operated by relays R410X, R430X, R440X and R450X over a circuit extending from ground over contacts 416X, 426X, 436X, 446X and 456X, conductor 293, contacts 487, 352 and 362 through the upper winding of R350 to battery. When relays R410X, R430X, R440X, R450X and R470X subsequently restore, relay R360 (Fig. 3) will be operated in series with R350 over a circuit extending from ground over contacts 471, conductor 292, the upper winding of R360, contacts 343 and 353 through the upper winding of R350 to battery.

When the tape reader 340X senses the sixth character Z of the start of message code, contacts 201, 202 and 206 close to operate relays R470X, R410X and R450X respectively. At contacts 471, R470X opens the circuit over which relays R360 and R350 have been held operated. Relay R350 will restore; however, because the sixth character Z has been sensed, relay R360 will be maintained operated by relays R410X and R450X over a circuit extending from ground over contacts 417X, 427X, 437X, 447X and 457X, conductor 297, contacts 490, 365 and 374 through the lower winding of R360 to battery. When relays R410X, R450X and R470X subsequently restore, relay R370 will be operated in series with R360 over a circuit extending from contacts 471, conductor 292, lower winding of R370, contacts 354 and 364, through the lower winding of R360 to battery.

When the tape reader 340X senses the seventh (last) character X of the start of message code, contacts 201, 202, 204, 205 and 206 are closed to operate relays R470X, R410X, R430X, R440X and R450X respectively. At contacts 471, relay R470X opens the circuit over which relays R370 and R360 have been held operated. Relay R360 will restore; however, because the seventh character X has been sensed, relay R370 will be maintained operated by relays R410X, R430X, R440X and R450X over a circuit extending from ground over contacts 416X, 426X, 436X, 446X and 456X, conductor 293, contacts 487 and 372 through the upper winding of R370 to battery. When relays R410X, R430X, R440X, R450X and R470X subsequently restore, relay R375 will be operated in series with relay R370 over a circuit extending from battery through the upper winding of R370, contacts 377, 485, 373 and 363, through the middle winding of R375 and conductor C616DPX to ground on contacts 597X. At contacts 378, relay R375 will lock itself operated over its lower winding; at contacts 376, will partially prepare a circuit for the end of message relay R590X; and, at contacts 377, opens its original operating circuit to cause R370 to restore.

The entire start of message code has been sensed by tape reader 340X, relay R375 has been locked operated to indicate the detection and registration of the start of message code, and all of the other relays R310—R370 of the start and end of message detector have been restored.

It will be noted that the accept relay R210 of the pre-sensing circuit has been held operated during this time over a multiple locking circuit including contacts 311, 321, 331, 341, 351, 361 and 371 of the detector relays;

however, when relay R370 restored as described above, the holding circuit of R210 is opened to cause R210 to restore. The pre-sensing relays R235 and R230 are again connected to the cam controlled contacts 201—206 of the tape reader 340X, and the sensing relays 401X are disconnected therefrom. The sensing relays 401X and the start and end of message detector are now rendered ineffective until the first character X of a start of message code or the first character, figure shift, of an end of message code is sensed by the tape reader 340X.

It will be noted that, if at any time during sensing of the start of message code, as described above, the tape reader 340X had sensed a character other than X or Z or had sensed X or Z out of their proper sequence, then all of the relays in the start and end of message detector and the accept relay R210 of the pre-sensing circuit would have been restored. For example, assume that, after the first three characters XZX had been sensed relays R330 and R340 being operated in series, the character X rather than Z was sensed by the tape reader 340X. When X is sensed as a fourth character, relay R470X opens contacts 471 to open the holding circuit of R330 and R340; R330 restores as described above; but now relay R340 cannot be maintained operated over its lower winding as described above because its holding circuit is opened at contacts 337X and 347X of relays R340X and R440X, which relays are operated as described above when character X is sensed. Therefore relay R340 also restores. The holing circuit of the accept relay R210 is opened to restore R210 when R330 and R340 restore.

*Tape reader 340X senses a start of message code out of order*

Assume that a first start of message code is sensed and registered as described above, relay R375 being operated. Assume now that before an end of message code is sensed the tape reader 340X senses a second start of message code XZXZXZX. The operations of the tape reader 340X, the pre-sensing circuit, and sensing relays 401X and the combination start and end of message detector will be the same as described above when the first six characters XZXZXZ are sensed. Relays R360 and R370 are operated in series over a circuit described above after the sixth character Z has been sensed. When the seventh character X is sensed by the tape reader 340X, relays R410X, R430X, R440X, R450X and R470X will be operated as described above; and relay R370 will be maintained operated while R360 restores. The ground potential, extended over a previously described circuit to maintain R370 operated over its upper winding, is further extended from said upper winding over contacts 376 and 383 through the upper winding of the sequence alarm relay R380 to battery. R380 operates, locks itself operated over an obvious circuit and causes an alarm to be given in a manner well known in the art.

*Tape reader 340X senses an end of message code "figure shift , , , , , , ."*

Assume that a start of message code has been detected, relay R375 being maintained operated over a locking circuit previously described and the pre-sensing relays R235 and R230 being again connected to the tape reader contacts 201—206 all in a manner described above.

When the figure shift character is sensed by the tape reader 340X, contacts 202, 203, 205 and 206 close to operate relay R230 (Fig. 2) over a circuit extending from ground over contacts 202, 212, 214, 203, 216, through the winding of R230, contacts 222, 205, 224, 226, 206 and 228 to resistance battery. Contacts 203 short circuit relay R235 to prevent its operation. Contacts 201 also close to operate relay R470X over an obvious circuit. At contacts 232, relay R230 operates relay R300 (Fig. 3) over a circuit extending from ground over contacts 232 and 237, conductor 295, contacts 488 and through the winding of R300 to battery. When relays R230 and R470X restore, relay R310 is operated in series with relay R300 over a circuit extending from ground over contacts 471, conductor 292, the lower winding of R310, contacts 305, through the winding of R300 to battery. At contacts 312 and 303, relays R310 and R300 complete an obvious circuit for operating the figure shift relay R480X; and, at contacts 301 and 312, relays R300 and R310 operate the accept relay R210 over a circuit extending from ground over contacts 312 and 301, conductor 291, through the winding of R210 to battery. At contacts 229, R210 locks itself operated over a circuit extending from battery through the winding of R210, contacts 229, conductor 290 to ground on contacts 311. As described above, relay R210 disconnects relays R230 and R235 from the tape reader contacts 201—206 and connects the sensing relays 401X thereto.

At contacts 481, relay R480X locks itself operated over an obvious multiple circuit; at contacts 482, further prepares a circuit for operating the end of message relay R590X; and, at contacts 486 and 489, connects conductor 296 to both of the marking conductors of the start and end of message detector.

When the tape reader 340X senses the first comma (,) of the end of message code, contacts 201, 204 and 205 close to operate the sensing relays R470X, R430X and R440X. At contacts 471, R470X opens the circuit over which relays R300 and R310 have been held operated. Relay R300 restores; but relay R310 is held operated over a circuit extending from ground over contacts 415X, 425X, 435X, 445X and 455X, conductor 296, contacts 486, 313 and 326, through the upper winding of R310 to battery. When relays R430X, R440X and R470X restore, relay R320 operates in series with R310 over a circuit described above with respect to the detection of a start of message code.

When tape reader senses the next five commas (,) of the end of message code, the start and end of message detector will operate in a manner similar to that in which it operated when the second, third, fourth, fifth and sixth characters (ZXZXZ) of the start of message code was detected. After the sixth comma has been sensed, relays R360 and R370 are held operated in series; also it will be remembered that relays R375 and R480X are operated at this time.

When the tape reader 340X senses the seventh (last) comma of the end of message code, relays R430X, R440X and R470X operate. At contacts 471, relay R470X opens the circuit over which R360 and R370 have been held operated. Relay R360 will restore; but, as described above, relay R370 will be held operated by relays R340X and R440X, which latter relays will also operate the end of message relay R590X (Fig. 3) over a circuit extending from ground over contacts 415X, 425X, 435X, 445X and 455X, conductor 296, contacts 486, 372, 376 and 482, through the upper winding of R590X to battery.

At contacts 596X, R590X locks itself operated; and, at contacts 597X, opens the locking circuit of relay R375; and R375 restores slowly due to its upper shunting winding.

When R430X, R440X and R470X restore; relay R370 restores to restore at contacts 371 the accept relay R210 and the figure shift relay R480X. Relay R375 is controlled by its upper shunting winding to restore after relays R430X, R440X and R470X to prevent a false operation of the sequence alarm relay R380. The pre-sensing relays R230 and R235 are re-connected to the contacts 201—206 of the tape reader 340X, and the sensing relays 401X are disconnected therefrom when the accept relay R210 restores.

The tape reader 340X, the pre-sensing relays R230 and R235, the sensing relays 401X and the combination start and end of message detector are in their normal condition, ready to sense and detect another start or end of message code, except that the end of message relay R590X is operated.

R590X is held operated until the incoming line circuit 400X releases consequent to the message being retransmitted to a cross office unit.

*Tape reader 340X senses an end of message code out of order*

Assume that the start and end of message detector is in its normal condition—i. e. none of its relays are operated and that the tape reader now senses end of message code. The operations of the pre-sensing, sensing, and detector circuits in response to the sensing of the figure shift and the first six commas are similar to those described above, after which sensing, relays R360 and R370 are maintained operated over a circuit described above as well as the accept relay R210 and the figure shift relay R480X.

When the tape reader 340X senses the seventh (last) comma of the end of message code, relay R360 will restore as described above and relay R370 will be held operated over a circuit extending from ground over contacts 415X, 425X, 435X, 445X and 455X, conductor 296, contacts 486 and 372, through the upper winding of R370 to battery; and a branch of said circuit extends ground from said winding of R370, over contacts 377 of the unoperated relay R375, contacts 484, through the winding of the sequence alarm relay R380 to operate R380. R380 locks itself operated and causes an alarm to be given.

While there has been described what is at present considered to be the preferred embodiment of the invention, it will be understood that various modifications thereof may be made; and it is contemplated to cover in the appended claims all such modifications as fall within the true spirit and scope of the invention.

What is claimed is:

1. For use in an automatic telegraph switching center wherein a control unit is seized subsequent to the sensing of a multiple character start of message designation included in a message which is received over an incoming line and is recorded on a tape in an incoming line circuit terminating said line and wherein said control unit is thereafter operated consequent to the sensing of an address designation accompanying said message for selecting one of a plurality of switching units, for selectively connecting said selected switching unit to a desired outgoing line, for causing the message to be retransmitted to and recorded in said selected switching unit and for causing the selected switching unit to thereafter transmit the message over said desired outgoing line when it becomes idle, means in said line circuit for sensing said record; a detecting and registering means; means normally associated with said sensing means and operated responsive to the sensing of the first character of said start of message designation; means controlled by said last means for associating said detecting and registering means with said sensing means; said detecting and register means thereafter controlled responsive to the sensing of the remaining characters of said start of message designation for registering the same and for thereafter disassociating said detecting and register means for said sensing means.

2. For use in an automatic telegraph system, an arrangement for detecting predetermined multiple character codes appearing with a message upon a record bearing medium, said arrangement comprising a mechanism for sensing the record on said medium, a pre-sensing relay for each of said multiple character codes, each of said relays operated responsive to the sensing of the first character of its corresponding code, a group of register relays and a group of decoding relays, means for connecting said decoding relays to said sensing mechanism responsive to the operation of one of said pre-sensing relays consequent to the sensing of its respective multiple character code, said decoding relays selectively operated responsive to the sensing of the remaining characters of said respective code for operating said register relays to record said sensing of said code, means responsive to said registration of said respective code for causing said first mentioned means to disconnect said decoding relays from the sensing mechanism and means, including said decoding relays, responsive to the sensing of a character of said respective multiple character code out of order and responsive to the sensing of a character not included in said respective multiple character code for restoring said register relays to normal and for disconnecting the sensing relays from the sensing mechanism, whereby said sensing relays are operated only while one of said multiple character codes is being successfully sensed.

3. The combination claimed in claim 2 together with an alarm relay and means including said register relays for operating said alarm relay responsive to the sensing mechanism sensing any one of said multiple character codes twice in succession without sensing another code therebetween.

4. For use in a telegraph system, a tape reader; a pre-sensing relay connected thereto and operated in response to said reader sensing the first character of a predetermined multiple character code; a group of sensing relays; means operated consequent to the operation of said pre-sensing relay for disconnecting the tape reader from the pre-sensing relay and for connecting the reader to the sensing relays, said sensing relays controlled by said tape reader in accordance with the record sensed thereby; a detecting and registering device comprising a group of relays operable in pairs, the first and second of said detecting relays operated in series with each other in response to the operation of said pre-sensing relay; means including said sensing relays thereafter controlled responsive to the tape reader sensing each succeeding character of said code for restoring one of the operated detecting relays and for operating the next succeeding detecting relay in series with the other operated detecting relay; said last means controlled responsive to the sensing of a character other than a correct character of said code in its proper sequence for restoring both operated detecting relays, for disconnecting said sensing relays from the tape reader and for reconnecting said pre-sensing relay thereto; means operated responsive to the successful detection of said code for restoring all except the last operated relay in the detecting circuit, for disconnecting the sensing relays from the tape reader and for reconnecting the pre-sensing relay thereto.

5. For use in a telegraph system having a tape with a message and a predetermined multiple character control code recorded thereon, a means for sensing the recorded information and a detector circuit comprising an incoming hold conductor normally having a certain electric potential connected thereto; a pair of incoming marking conductors; a group of register relays arranged in order; a decoding means; means for connecting the decoding means to the sensing means; said decoding means effective for momentarily removing said potential from said hold conductor responsive to each character sensed by the sensing means; said decoding means also effective in response to the sensing means sensing succeeding characters of said predetermined code for momentarily connecting an electric potential alternately to one then the other of said marking conductors so that each momentary connection is substantially simultaneous with the removal of said first-mentioned potential from the hold conductor; means for operating two of said register relays in series with each other over a first circuit including said hold conductor with its potential connected thereto; a second circuit, including a certain one of said marking conductors, for maintaining a certain one of said two register relays operated while said first-mentioned potential is subsequently removed from the hold conductor; said second circuit partially completed in response to the operation of said certain one register relay; said decoding means effective in response to the sensing of a certain character of said code in its proper sequence for restoring the other of said two register relays and for momentarily completing said second circuit to maintain said certain one register relay operated; said decoding means thereafter effective before the sensing of the next character for operating a third one of said register relays in series with said certain one register relay over a branch of said first circuit including said hold conductor with its potential connected thereto; a third circuit, including the other marking conductor, for maintaining said third register relay operated while said first-mentioned potential is subsequently removed from the hold conductor; said third circuit partially completed in response to the operation of said third register relay; said decoding means effective in response to the sensing of the next character of said code for restoring said certain one register relay and for momentarily completing said third circuit to maintain said third register relay operated; said decoding means thereafter effective before the sensing of the next character for operating a fourth one of said register relays in series with said third register relay over another branch of said first circuit including said hold conductor with its potential connected thereto; and said decoding means effective in response to the sensing of a character other than the correct character of said code in its proper sequence for restoring all operated register relays.

6. For use in a control system wherein control functions are initiated consequent to the successful sensing of a certain multiple character control code stored together with other information on a storing medium, means for sensing said information; register means; switching means operated consequent to the sensing of the first character of said certain code for associating said register means with said sensing means and for rendering said register means effective; said register means thereafter operated by the sensing means consequent to the successful sensing of each of the remaining characters of said certain code to register the same; said register means also controlled by said sensing means consequent to the sensing of a character other than a correct character of said certain code in its proper sequence for restoring itself to normal and for causing said switching means to disassociate the register means from the sensing means, whereby the register means will be operated only while the correct characters of said certain code are being sensed in their proper sequence; and said switching means controlled upon the successful registration of said certain code for disassociating said register means from the sensing means.

7. In the combination, a storing medium having information recorded thereon in code; means for sensing said information; a decoder controlled by the sensing means for performing various operations in accordance with the information sensed; and a register circuit controlled by the operations of said decoder for detecting and registering a predetermined multiple character code included in said information, said register circuit comprising a group of relays, certain circuits controlled by the decoder when a certain character in said predetermined code is sensed for operating two of said relays in series, certain circuits thereafter controlled by the decoder when each of certain succeeding characters of said multiple character code are sensed for restoring one of the operated relays and for operating the next succeeding relay in series with the other operated relay, whereby no more than two of said relays will be operated at all times, said certain circuits also controlled by the decoder when a character other than a corrected character of said predetermined code is sensed in its proper sequence for restoring both operated relays.

References Cited in the file of this patent
UNITED STATES PATENTS

| | | |
|---|---|---|
| 1,943,475 | Gurley | Jan. 16, 1934 |
| 2,569,980 | Eggensperger | Oct. 2, 1951 |
| 2,570,505 | Watson | Oct. 9, 1951 |
| 2,608,615 | Oberman | Aug. 26, 1952 |
| 2,703,338 | Stiles | Mar. 1, 1955 |
| 2,739,180 | Britt | Mar. 20, 1956 |